United States Patent [19]

Hauser

[11] 4,362,208
[45] Dec. 7, 1982

[54] MOTOR VEHICLE, ESPECIALLY A TRUCK, WITH A COOLING SYSTEM FOR AN INTERNAL COMBUSTION ENGINE

[75] Inventor: Kurt Hauser, Stuttgart, Fed. Rep. of Germany

[73] Assignee: Süddeutsche Kühlerfabrik Julius Fr. Behr GmbH & Co. K.G., Stuttgart, Fed. Rep. of Germany

[21] Appl. No.: 195,855

[22] Filed: Oct. 10, 1980

[30] Foreign Application Priority Data

Oct. 10, 1979 [DE] Fed. Rep. of Germany ....... 2941093

[51] Int. Cl.³ .............................................. B60K 11/04
[52] U.S. Cl. .................................... 165/51; 123/41.49; 123/41.51; 165/44; 165/134 R; 180/68 R
[58] Field of Search ................ 123/41.48, 41.49, 41.51; 165/41, 44, 51, 134 R; 180/54 A, 68 R, 68 P

[56] References Cited

U.S. PATENT DOCUMENTS

| 2,247,962 | 7/1941 | Ormsby et al. | 180/68 R |
| 2,396,506 | 3/1946 | Harris | 180/54 A |
| 2,789,647 | 4/1957 | Couse | 123/41.51 X |
| 3,715,001 | 2/1973 | Wilson | 180/68 R |
| 3,774,710 | 11/1973 | Gustavsson | 123/41.51 X |
| 3,929,202 | 12/1975 | Hobbensiefken | 180/68 R |
| 3,934,644 | 1/1976 | Johnston | 165/51 |
| 4,186,693 | 2/1980 | Thien et al. | 180/68 R X |

FOREIGN PATENT DOCUMENTS

| 2530741 | 1/1977 | Fed. Rep. of Germany .... | 180/68 R |
| 2530742 | 1/1977 | Fed. Rep. of Germany .... | 180/68 R |
| 2530743 | 1/1977 | Fed. Rep. of Germany .... | 180/68 R |
| 2747785 | 5/1978 | Fed. Rep. of Germany .... | 180/68 R |
| 688559 | 3/1965 | Italy ................................... | 180/68 R |

Primary Examiner—Sheldon J. Richter
Attorney, Agent, or Firm—Paul M. Craig, Jr.

[57] ABSTRACT

A motor vehicle, especially a truck, with a cab and a cooling system for an internal combustion engine is disclosed. The cooling system comprises a heat exchanger disposed in an engine compartment and provided with an associated blower, and at least one additional heat exchanger located outside the engine compartment and with which an additional blower is associated. The additional blower is mounted on a roof of the cab and is connected through a channel with the additional heat exchanger which is located inside the channel in the vicinity of one wall of the cab.

19 Claims, 10 Drawing Figures

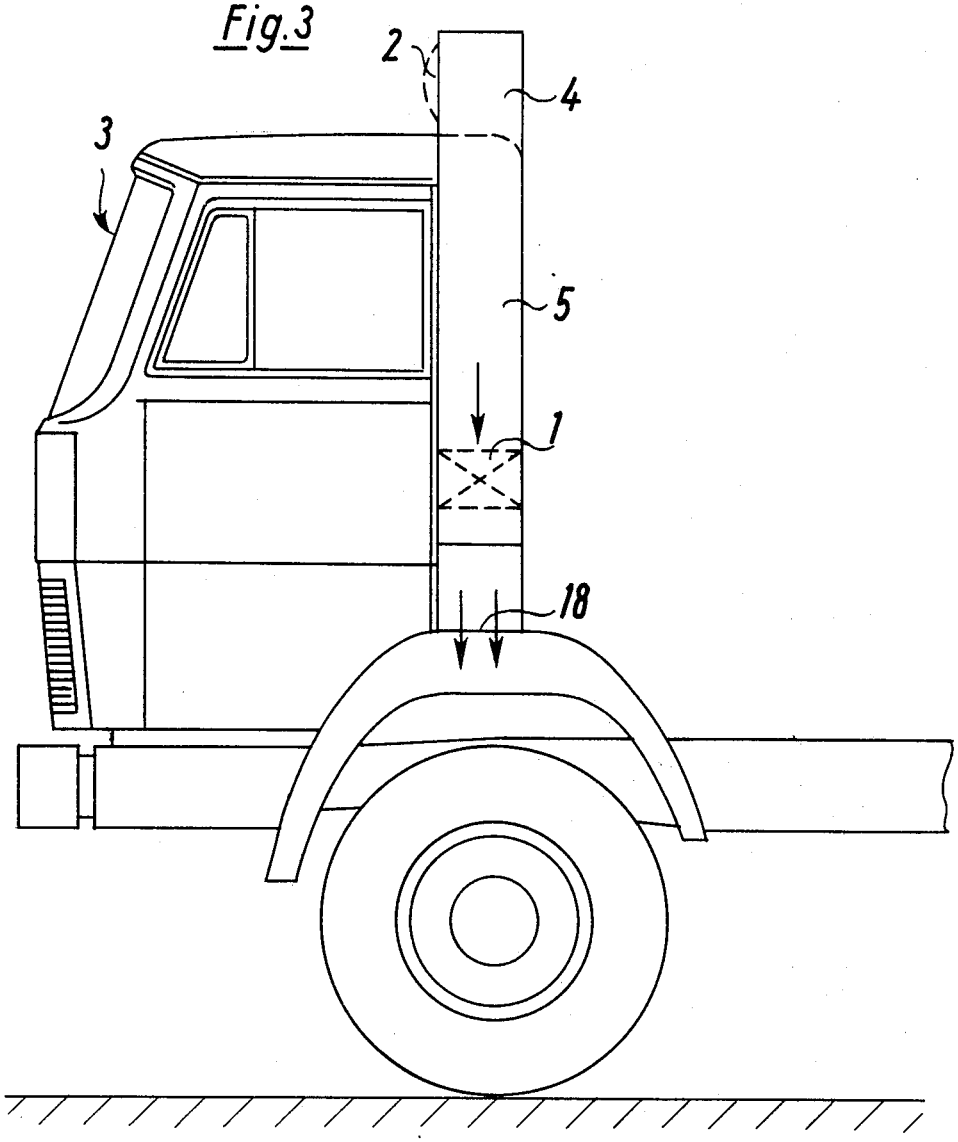

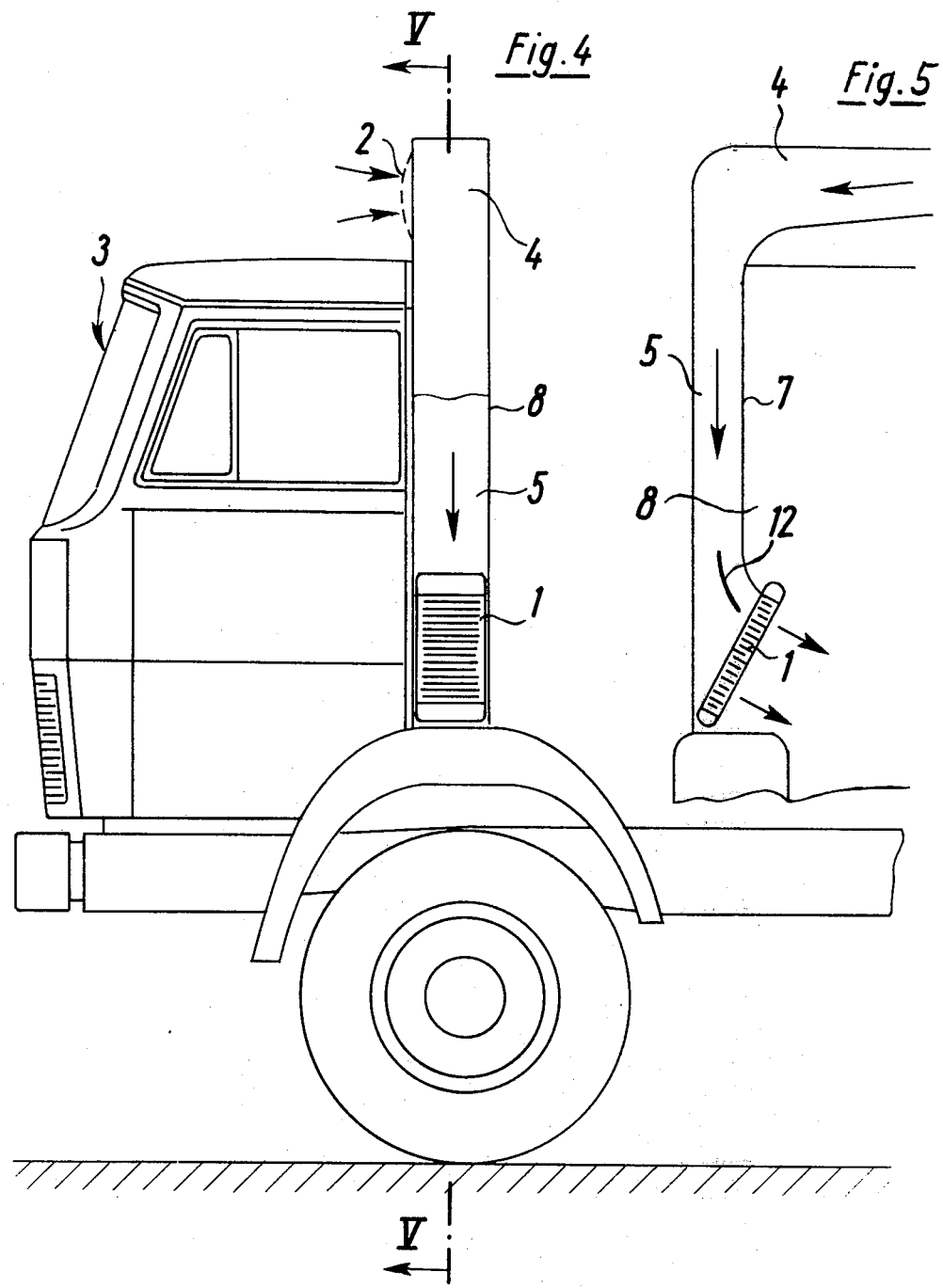

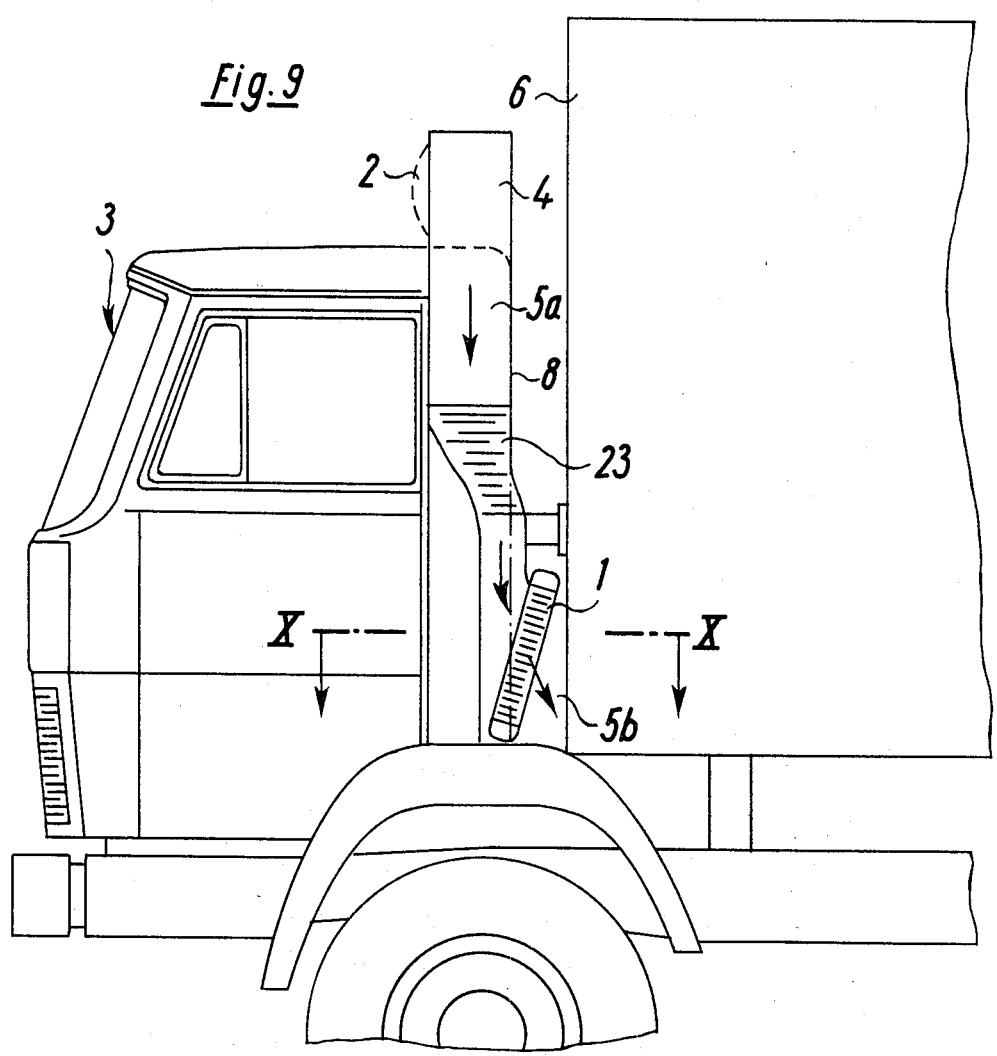
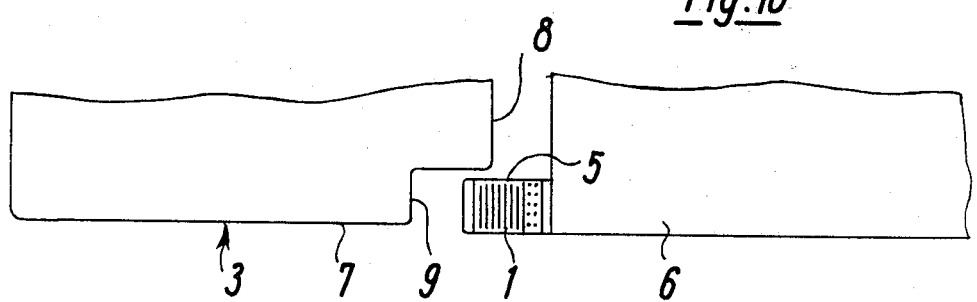

MOTOR VEHICLE, ESPECIALLY A TRUCK, WITH A COOLING SYSTEM FOR AN INTERNAL COMBUSTION ENGINE

BACKGROUND AND SUMMARY OF THE INVENTION

The present invention relates to a motor vehicle, especially a truck, with a cab and with a cooling system for an internal combustion engine, said cooling system comprising a heat exchanger located in an engine compartment and provided with an associated blower, and one or more additional heat exchangers located outside the engine compartment, and with an additional blower associated with said additional heat exchangers.

It is now required that the noise produced by motor vehicles, especially trucks, be reduced by approximately 10 dB(A) by comparison with the values presently allowed. This means that the noise produced by the cooling system, especially the fan, must be reduced by at least the same amount. Numerous proposals have been made to achieve this. Considering only the construction cost of the cooling device, the simplest solution is to use a low-noise radial fan in conjunction with a heat exchanger mounted in the usual fasion, a so-called front radiator (German Offenlegungsschrift No. 2,530,742).

A radial fan, however, requires a much greater installation depth than the axial fan usually employed, resulting in installation problems. Since the total length of the vehicle may not be increased, mounting the radial fan in many cases shortens the truck bed by at least the amount by which the installation depth of the radial fan is greater than that of an axial fan.

It is also known (German Offenlengungsschrift No. 2,530,741 and German Offenlegungsschrift No. 2,530,743) to mount the entire cooling system behind the cab, but this results in the same problems relating to shortening of the truck bed.

It is also known (German Offenlegungsschrift No. 2,747,785) to mount the cooling system on the cab roof. It is true that this avoids the above-mentioned disadvantages relating to space requirements, but there are considerable objections to an arrangement of this kind because there is a danger that, especially in accidents, coolant could escape from the heat exchanger and pose the danger of scalding the occupants of the cab.

It is also known to mount two cooling systems side by side in the engine compartment and to operate their corresponding axial blowers at a reduced rpm, whereby noise reduction is achieved. However, in many cases, such a design cannot be used, or can be used only with difficulty, because of limited space.

Use of a main cooling system and one or more additional cooling systems is also the subject of the present invention.

More specifically, an object of the present invention is to provide a motor vehicle such as a truck with a cooling system whose noise, on the one hand, is reduced but which can, on the other hand, be installed without losing truck bed space and which poses no danger of scalding from escaping coolant.

This and other objects of the present invention are attained by providing a motor vehicle with a cab and a cooling system for an internal combustion engine, said system comprising a heat exchanger disposed in an engine compartment and provided with an associated blower and at least one additional heat exchanger located outside the engine compartment and with which an additional blower is associated, and wherein said additional blower is mounted on a roof of the cab and is connected through channel means with said additional heat exchanger which is located within said channel means in the vicinity of one wall of the cab and at a level below the roof of the cab when the vehicle is in an upright position.

In a disclosed embodiment of the present invention the channel means includes a channel in the vicinity of one wall of the cab and within which the additional heat exchanger is located and a connecting channel between said channel and the additional blower mounted on the roof of the cab.

This arrangement provides sufficient space for mounting a blower which is suitable in terms of the noise it produces, so that the ambient noise produced by the additional system and the interior noise level may be kept low. Of course, optimally designed blowers may be used, for example radial blowers with spiral cases, axial blowers with guide vanes behind the axial impeller or cross-flow blowers with a high pressure-coefficient and a correspondingly low circumferential velocity. If necessary, these blowers can also be used in conjunction with a narrow diffuser, resulting in a low-loss conversion of dynamic to static pressure. The channel which holds the additional heat exchanger or exchangers can be made breakage-resistant by simple means, so that the danger of a defect in the heat exchanger resulting from an accident can be sharply reduced. In addition, the escaping coolant is guided in the channel so that there is a very small danger of the hot coolant being able to penetrate the cab in the event of a defect or an accident.

Another embodiment of the invention provides for the channel containing the additional heat exchanger or exchangers being mounted laterally with respect to the cab. A free space, permitting easy installation of a channel with a heat exchanger, is located in this area in cabs that are slightly narrower than the body of the truck. It may be advantageous in this connection for the channel to be intergrated together with the additional heat exchanger or exchangers in the side wall of the cab. Such an arrangement is advantageous, on the one hand, in cabs whose width matches the width of the truck body behind, and also the visual appearance of the truck is not affected in a disadvantageous manner by the channel and the additional heat exchanger.

In another embodiment of the invention, the channel with the additional heat exchanger or exchangers is located in the vicinity of the rear wall of the cab, preferably between the seats. Such an arrangement, on the one hand, does not have a disadvantageous effect upon the truck's appearance, and, on the other hand, the heat exchanger is further protected against damage as the result of an accident. It is advantageous in this connection not to increase the structural dimensions when the channel containing the additional heat exchanger or exchangers is integrated into the rear wall of the cab. This can be accomplished, in particular, in the area between the seats located in the cab.

In order not to increase excessively the weight of the cab, which could be disadvantageous in the case of a cab which is tiltable about the area of its leading edge, in another embodiment of the invention provision can be made for locating the channel with the additional heat exchanger or exchangers on the body of the vehicle, and connecting it to a connecting duct mounted on the cab by means of, preferably, separable connections. Such an arrangement of the channel is feasible both in the lateral area of the cab and also in the vicinity of the rear wall. It is advantageous in this connection for the cab to have a depression in the vicinity of the channel with the additional heat exchanger or exchangers. On the one hand, this ensures that there will be no need to take into account any increase in the structural length or reduction of truck bed area, while, on the other hand, tiltability of the cab remains ensured.

In another embodiment of the invention, provision is made for at least partially lining the connecting channel from the blower to the additional heat exchanger or exchangers with noise-damping and preferably absorbent material. This further reduces the noise generated by this subassembly of the cooling system. Moreover, this has the advantage, when the material is absorbent, that the coolant which escapes in the event of a defect will be absorbed at least partially by this material.

In another embodiment of the invention, it is provided that a sealing means or element in the form of a valve is located between the additional heat exchanger or exchangers and the blower, preferably in the connecting channel, which closes off the channel. This sealing means or element, preferably controlled by position sensors, shuts off the connection to the blower in the event of an excessive tilting of the vehicle either sideways or lengthwise, indicating an accident, so that the danger of escaping fluid entering the cab area is further reduced.

In order to achieve uniform flow to the additional heat exchanger or exchangers, it is advantageous to locate air-guiding elements in the channel upstream of the heat exchanger or exchangers.

In order to decrease further the amount of noise which escapes to the exterior, another embodiment of the invention provides for locating a noise damper upstream of the additional blower.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 3 is a side view of another embodiment similar to FIG. 1;

FIG. 4 is a side view of a truck similar to FIGS. 1 and 3;

FIG. 5 is a partial cross section along line V—V in FIG. 4;

FIG. 9 is a partially cut away side view of a truck with an additional cooling system according to the invention, said system being mounted partially on the truck body, and FIG. 10 is a cross section along line X—X in FIG. 9.

DETAILED DESCRIPTION OF THE DRAWINGS

Figure 1:
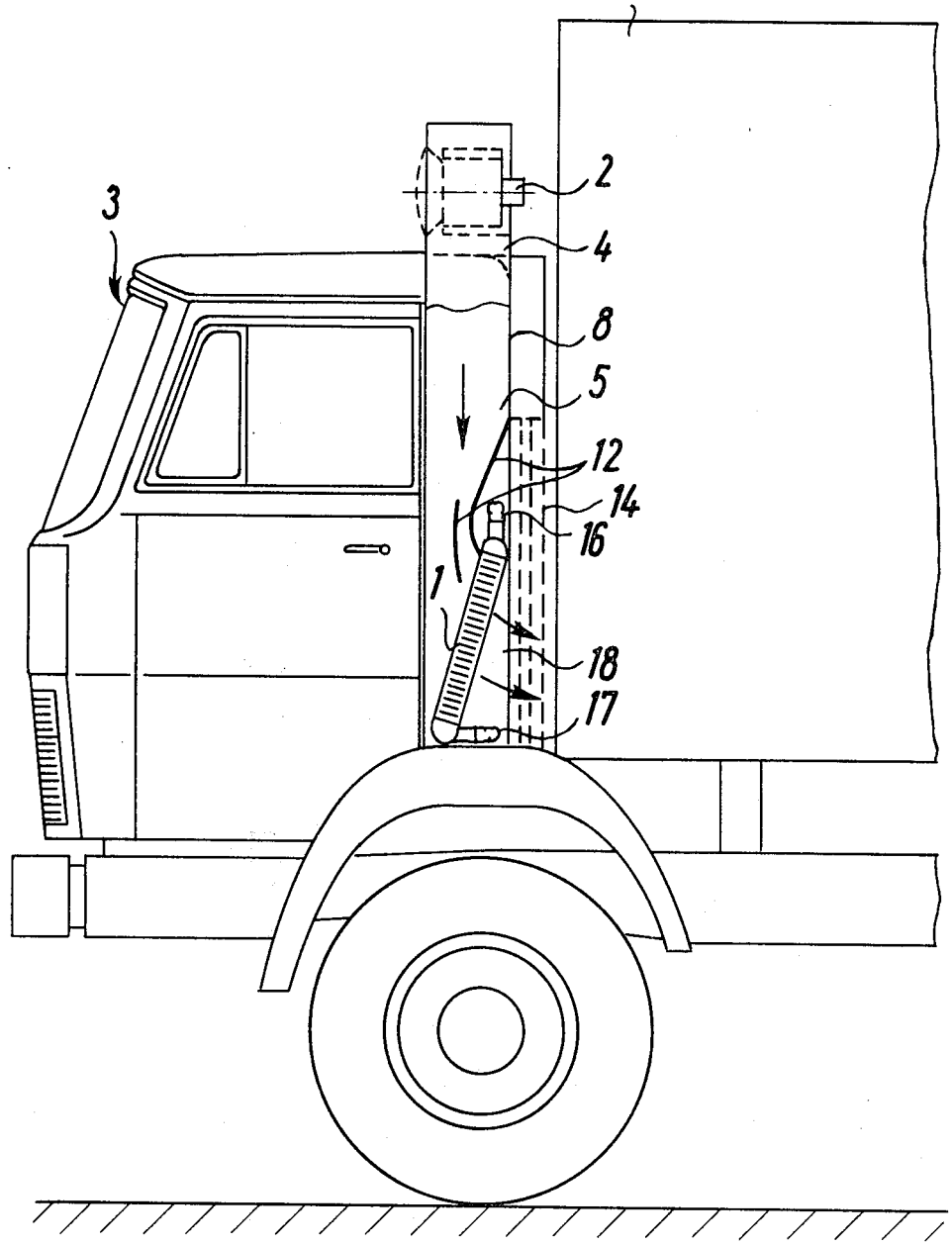
FIG. 1 shows a partially cut away side view of the front area of a truck equipped according to the invention.
Figure 2:
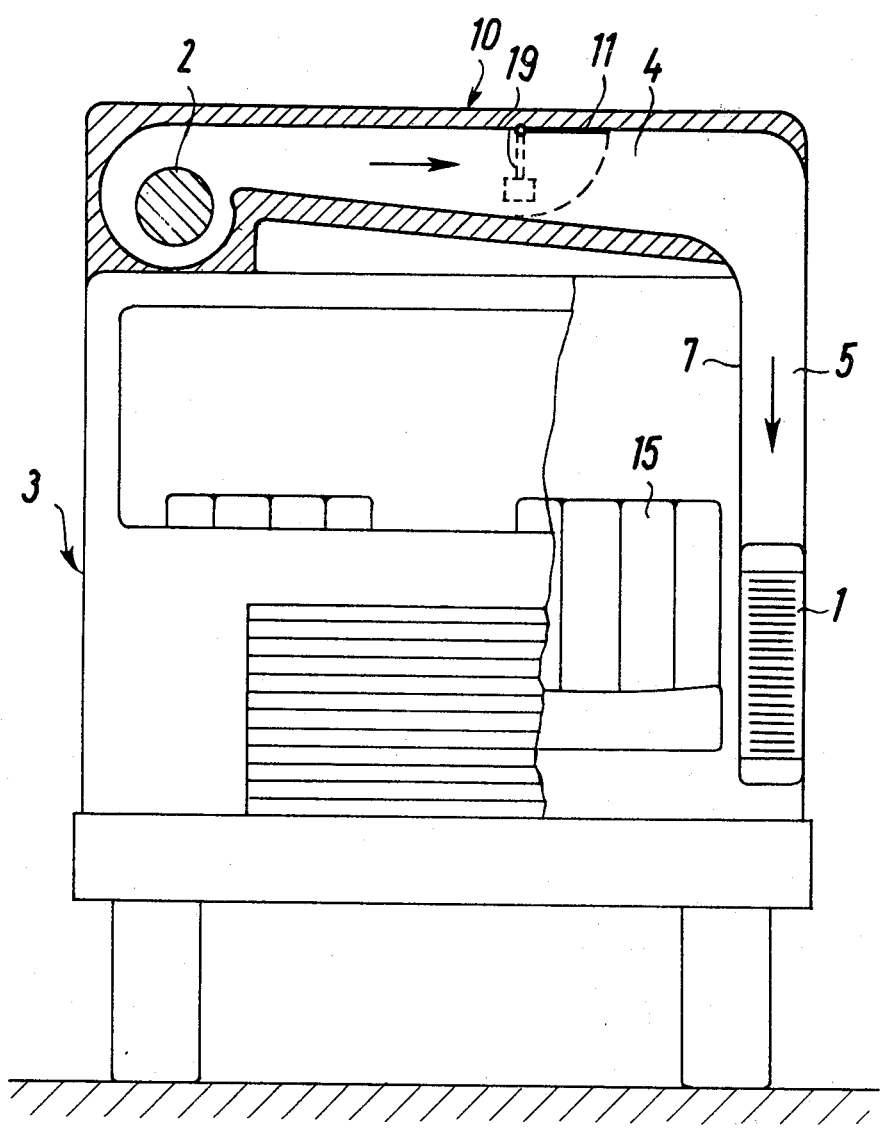
FIG. 2 is a partially cut away front view of the truck shown in FIG. 1.

The truck shown in FIGS. 1 and 2 has a cab 3 and a body 6 connected thereto with a short space between them. An internal combustion engine, not shown in greater-detail, is located in known fashion beneath and inside cab 3, said engine driving the truck. In order to make the engine accessible for maintenance or repair, cab 3 is preferably tiltable forward about a transverse axis located at right angles to the direction of travel, in the vicinity of the lower front edge. The internal combustion engine is associated with a cooling system which consists essentially of a heat exchanger located inside the engine compartment and not shown, a so-called front radiator, and a fan associated with the latter, especially an axial fan. This heat exchanger, located in the engine compartment, and the associated fan are arranged so that approximately 70% of the maximum cooling power is applied by this cooling system. This design makes it possible to reduce the amount of noise generated by the cooling system and especially the fans by about 10 dB(A) by comparison with other cooling systems, wherein the cooling system, located entirely in the engine compartment, produces all of the cooling. The remaining cooling power is provided in the truck shown by an additional cooling system which is so arranged and designed that, on the one hand, there is no need to allow for an increase in the length of the truck or a reduction of its bed area, and, on the other hand, the noise generated by this additional cooling system can be reduced to a minimum. Advantageously, switching elements are provided which cut in the additional cooling system and especially its blowers when a cooling capacity of more than, for example, 70% of the maximum cooling power is required.

The additional cooling system comprises a blower 2, mounted on the roof of cab 3 in the vicinity of the rear edge 8 of the roof. The space requirements on the roof of cab 3 are such that any suitable type of blower may be mounted which provides high capacity with low noise generation. In the embodiment shown, a radial fan 2 is provided which has an air intake pointing in the direction of travel. Additional blower 2 operates with an additional heat exchanger 1, located laterally on cab 3 in front of rear wall 8, so that the length measurements do not have to be changed. Heat exchanger 1 is located in a channel 5 which is made as pressure-tight as possible by means of the material used for making the channel and/or by reinforcements. A connecting channel 4 is provided between channel 5 and blower 2 located on the opposite side of the cab roof. The radial blower is provided with a spiral casing, to which is connected a connecting channel 4 in the form of a slender diffuser. A lining 10 is provided in the vicinity of blower 2 and in the connecting channel, said lining being composed of a noise-damping and preferably absorbent material. In this fashion, the blower noise can be screened out very well. Channel 5, which accepts heat exchanger 2 FIG. 2), is integrated into a side wall 7 of cab 3, in other words, it comes within the contours of the cab. Heat exchanger 1 is then located laterally behind a driver's seat 15. Such an arrangement of channel 5 is advantageous for optical and esthetic reasons. It is possible if cab 3 is designed in advance to contain the additional cooling system. If this is not the case, channel 5 with heat exchanger 1 can be mounted laterally on the side wall of cab 3. Such an arrangement produces no problems if the body 6, behind cab 3, is wider than cab 3. It is also possible to integrate channel 5 with additional heat exchanger 1 only partially in the side wall and to allow it partially to project.

Heat exchanger 1 is provided with connections 16 and 17 through which it is connected to the cooling system located in the engine compartment. In order to install a heat exchanger 1 through which the cooling air flows transversely, with the largest possible surface area, heat exchanger 1 is mounted in a nearly vertical position, and tilted slightly rearward. Louvers 12 are provided in channel 5 upstream of heat exchanger 1, said louvers ensuring maximally uniform air flow over the surface of heat exchanger 1. An air outlet opening 18 is provided adjacent to heat exchanger 1 in channel 5, the rear edge of said channel terminating flush with the rear wall 8 of the cab, through which opening 18 the air flowing through heat exchanger 1 emerges rearward and against the direction of travel and against body 6.

Heat exchanger 1 is arranged so that coolant emerging from it, especially cooling water, is practically completely prevented from entering the interior of cab 3 and causing scalding of the vehicle occupants. With the truck in the normal position, any coolant that escapes runs away downward. In order to ensure that this coolant can under no circumstances flow into the vicinity of the cab, channel 5 is surrounded with a jacket 14 which, owing to the tiltability of the cab, is preferably made of elastic material. After an accident, with the vehicle on its side or upside down, any coolant that escapes will collect in sealed channel 5 and may ultimately run out through blower 2 in the vicinity of the vehicle roof. The coolant is cooled sufficiently as it travels over this relatively long distance that it will scarcely be capable of producing any scalding, even if it does manage to enter the cab interior. In order to prevent the escape of coolant even under these circumstances, a sealing valve 11 is located in connecting channel 4 (FIG. 2), said valve being actuated by a position sensor 19. This position sensor 19 responds to excessive sidewise or lengthwise tipping, indicating an accident, and then closes valve 11. Any hot coolant that escapes from heat exchanger 1 will then be collected or absorbed and will not escape.

The embodiment according to FIG. 3 corresponds in its general outline to the embodiment shown in FIGS. 1 and 2, but the cooling air is not deflected in channel 5 upstream and downstream of heat exchanger 1. Air outlet 18 of channel 5 in this embodiment is directed vertically downward to the ground. In this embodiment, a crossflow radiator with a small surface area can be used as heat exchanger 1, whereby this heat exchanger either has a considerable depth in the airflow direction or a plurality of heat exchangers can be arranged in sequence.

In addition, the embodiment shown in FIGS. 4 and 5 essentially corresponds in structure to the embodiment shown in FIGS. 1 and 2. However, heat exchanger 1 is arranged so that the air flowing through it to the engine compartment of the vehicle emerges rearward. A heat exchanger with a large surface area and limited depth is provided, said heat exchanger being arranged so that it is tilted slightly out of vertical and points diagonally inward toward the engine compartment. Accordingly, an outward flow direction laterally and outward can be selected, but this might lead to impediment of other vehicles in traffic by the escaping cooling air.

The embodiments shown in FIGS. 1 to 5 are suitable for trucks with a "medium-length" or "long" cab, wherein the cab is extended outward toward the body above the seatbacks. In medium length cabs, the extension is on the order of 70 cm. In both cases, sufficient space is available to mount a heat exchanger which is capable of supplying 30% of the required maximum cooling power. It is important to note that the arrangement of the entire cooling system must essentially be such that the cooling system installed in the engine compartment achieves an optimum value in terms of its noise emissions, but the power to the supplementary cooling system must be kept as low as possible, having a favorable effect upon the cost of the supplementary system and also upon the weight of cab 3.

Figure 6:
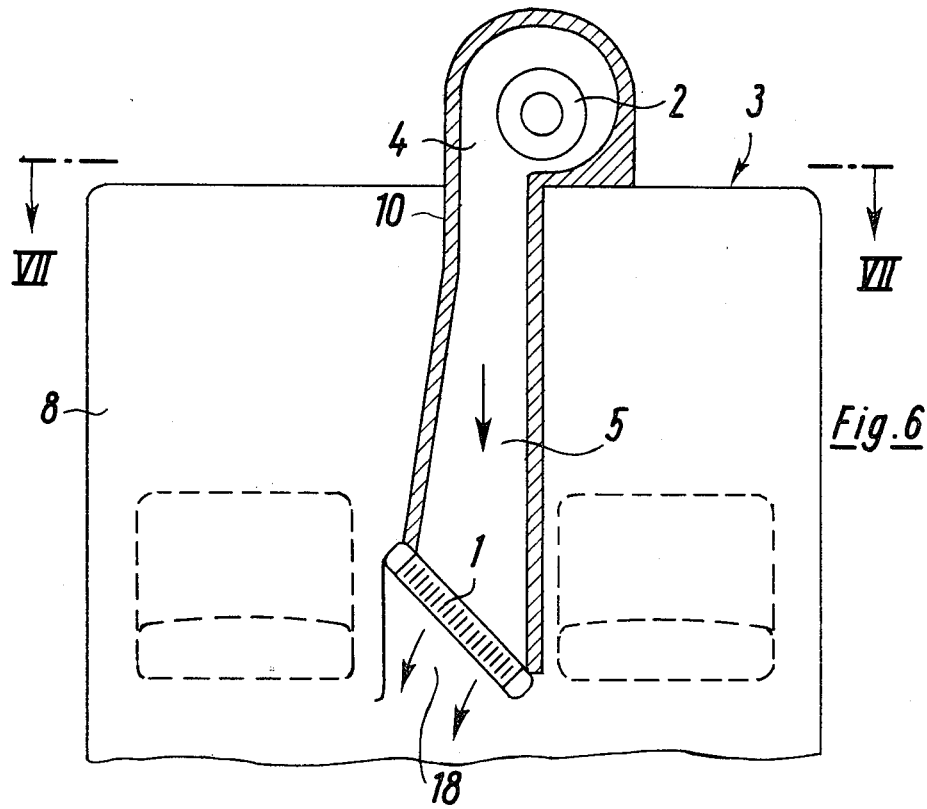
FIG. 6 is a view from the rear of a truck cab, with a channel containing a heat exchanger mounted in the area of the rear wall.
Figure 7:
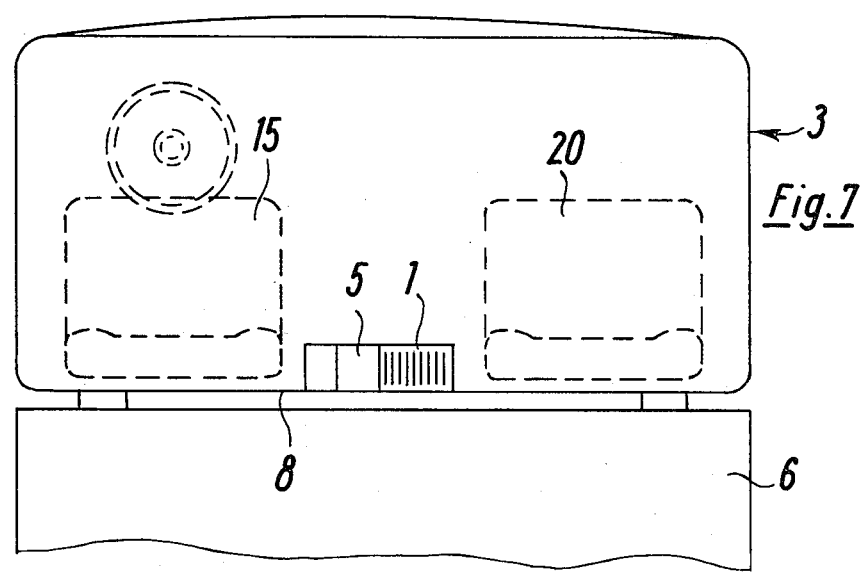
FIG. 7 is a section along line VII—VII in FIG. 6.

In the case of a short cab 3, wherein there is insufficient space to mount a channel with a heat exchanger between a lateral door opening and the rear wall, provision is made as shown in FIGS. 6 and 7 for channel 5 with heat exchanger 1 to be mounted in the vicinity of rear wall 8 of the cab. In the embodiment shown in FIGS. 6 and 7, channel 5, lined with noise-absorbent material 10, is integrated into the rear wall 8 of cab 3, so that it is located in the area between the driver's seat 15 and the helper's seat 20. Here again a heat exchanger 1 with a large surface area and a relatively shallow depth is provided, said heat exchanger being mounted so that it is tilted slightly toward the direction of flow of the cooling air. Air outlet opening 18 in this design is directed downward toward the engine compartment or the road. In this embodiment, the blower is mounted in the center of the roof. However, it is also possible to mount the blower at the side as shown in FIGS. 1 and 2.

It is also possible to mount heat exchanger 1 and channel 5 in a manner not shown in greater detail on the front wall of vehicle body 6, so that it is largely located outside the cab. Advantageously, a depression is then provided in the rear wall 8 of the cab in order not to shorten the truck bed. In addition, movements between the cab and the channel mounted on body 6 and tilting of cab 3 forward are not impeded.

Figure 8:
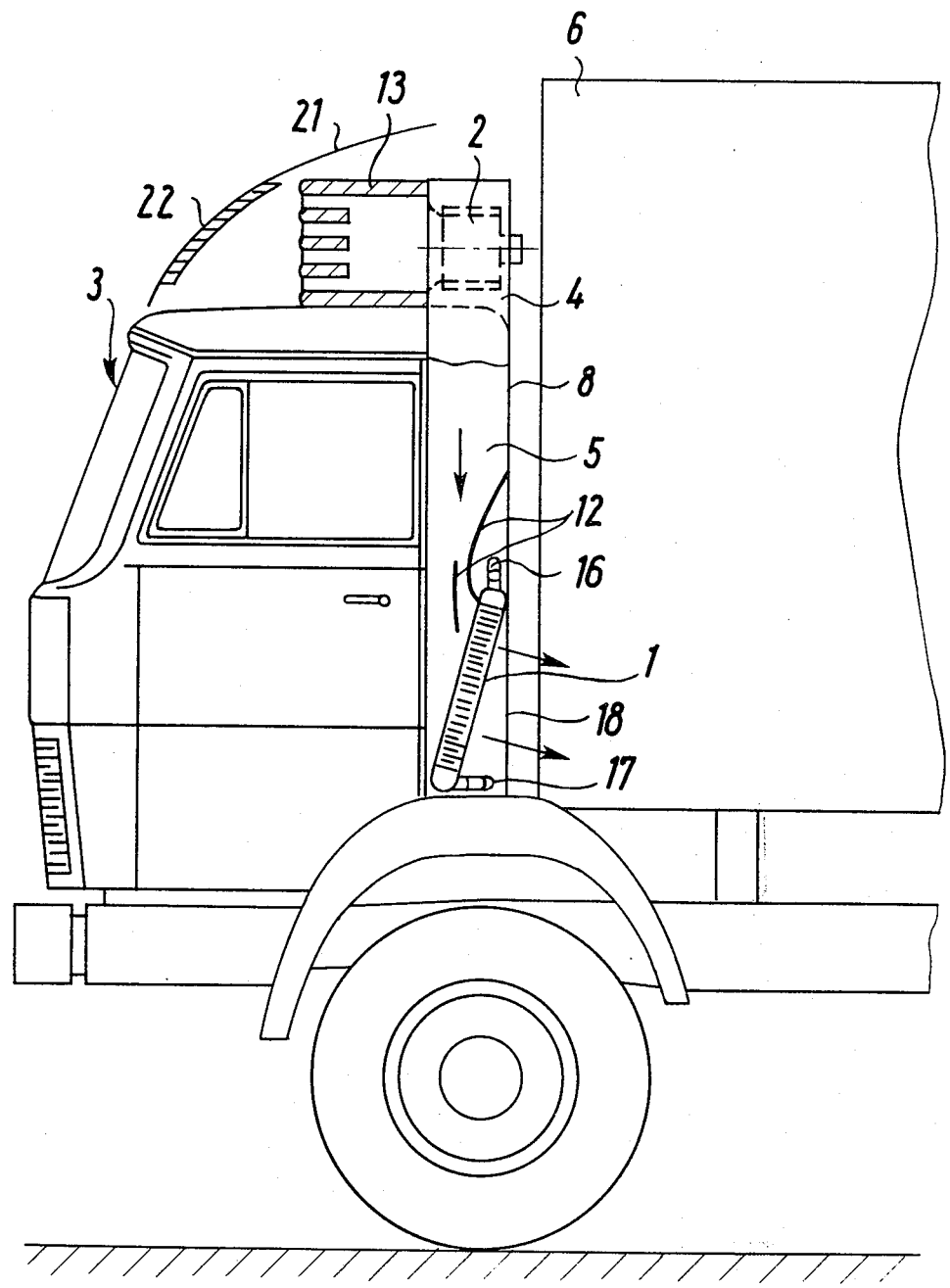
FIG. 8 is a partially cut away side view of a truck with an additional cooling system according to the invention, similar to FIG. 1.

The embodiment shown in FIG. 8 corresponds to the embodiment shown in FIG. 1. In addition, a muffler 13 is mounted on radial blower 2 on the air intake side, making it possible further to reduce noise emissions from the blower, by 6 dB(A), for example, or more, below the noise level of the cooling system located in the engine compartment. When the supplementary cooling system is switched on, the noise level does not rise. As is also shown in FIG. 8, a wind deflector 21 can be mounted on the cab roof, but it must have slots 22 in the area in front of muffler 13 or the air intake of blower 2.

Likewise, the embodiment shown in FIGS. 9 and 10 essentially corresponds to the embodiment shown in FIGS. 1 and 2. However, in this embodiment channel 5b which accepts heat exchanger 1 is mounted on the front wall of the vehicle body 6. The air outlet opening from channel 5b is then advantageously directed downward. Channel 5b is displaced slightly out of vertical in the lengthwise direction of the vehicle with respect to connecting channel 5a, in order to bridge the gap between cab 3 and the body. In addition, an elastic connecting section 23 is provided between channels 5a and 5b connecting the channels together. If cab 3 is to be made tiltable forward about the area of its lower front edge, it is advantageous to provide a depression 9 in the area of side wall 7 in order to permit this movement.

Provision is made in all embodiments for blower 2 to have an air intake opening which points in the direction of travel and for heat exchanger 1 to be mounted on the pressure side. In this arrangement it is possible to utilize dynamic pressure. However, it is also possible to allow the blower to work in the opposite direction and to draw in the cooling air through heat exchanger 1. In this case, blower 2 exhausts at right angles to the direction of travel. This has the advantage that the heated cooling air is expelled above the cab and cannot annoy other drivers. In this case, however, it is impossible to use the dynamic air pressure. In addition, it would be necessary to insulate the rear wall of the cab.

It is also possible to divide the supplementary system into two or more subsystems and to arrange, for example, a blower 2 which discharges to either side or two separate blowers mounted approximately centrally on the roof of cab 3, and to mount channels 5 with additional heat exchangers 1 on both sides of cab 3.

While I have shown and described only several embodiments in accordance with the present invention, it is understood that the same is not limited thereto but is susceptible of numerous changes and modifications as would be known to those skilled in the art, given the present disclosure, I therefore do not wish to be limited to the details shown and described herein but intend to cover all such changes and modifications as are encompassed by the scope of the appended claims.

I claim:

1. A motor vehicle with a cab and a cooling system for a single internal combustion engine, said system comprising a heat exchanger disposed in an engine compartment and provided with an associated blower for providing approximately 70% of the maximum cooling power of said system, and at least one additional heat exchanger located outside the engine compartment and with which an addtional blower is associated for providing the remaining cooling power of said system, wherein said additional blower is mounted on a roof of the cab and is connected through channel means with said additional heat exchanger which is located within said channel means in the vicinity of one wall of the cab, and wherein said additional heat exchanger is located at a level below the roof of the cab when said vehicle is in an upright position.

2. A motor vehicle according to claim 1, wherein said channel means includes a channel in the vicinity of said one wall of the cab and within which said additional heat exchanger is located and a connecting channel between said channel and the additional blower mounted on the roof of the cab.

3. A motor vehicle according to claim 2, wherein the channel containing the additional heat exchanger is located laterally with respect to the cab and in front of a vehicle body located behind the cab.

4. A motor vehicle according to claim 2, wherein said channel is integrated with said additional heat exchanger in a side wall of the cab.

5. A motor vehicle according to claim 2, wherein said channel is located in the vicinity of a rear wall of the cab.

6. A motor vehicle according to claim 5, wherein said channel is integrated with said additional heat exchanger in said rear wall of the cab.

7. A motor vehicle according to claim 5 or 6, wherein said channel is located in the vicinity of said rear wall of the cab and between a driver's seat and a passenger's seat located in said cab.

8. A motor vehicle according to claim 2, wherein said channel with said additional heat exchanger is mounted on a vehicle body located behind the cab.

9. A motor vehicle according to claim 8, wherein separable connection means are provided between said channel and said connecting channel.

10. A motor vehicle according to claim 8 or 9, wherein the cab is provided in the vicinity of said channel with the additional heat exchanger with a depression.

11. A motor vehicle according to claim 2, wherein said channel is enclosed with one or more jackets which screen it from the cab.

12. A motor vehicle according to claim 11, wherein said channel includes at least one air outlet opening, said channel being enclosed by said jackets at least in the area of said air outlet opening.

13. A motor vehicle according to claim 2, wherein a sealing means is provided in said connecting channel between said additional heat exchanger and said additional blower for blocking the connecting channel upon excessive vehicle tipping thereby preventing escape of hot coolant.

14. A motor vehicle according to claim 1, wherein said channel means is at least partially lined with noise-damping material.

15. A motor vehicle according to claim 14 wherein said noise-damping material is absorbent for absorbing coolant which may escape in the event of a defect in or damage to the cooling system.

16. A motor vehicle according to claim 1, wherein a sealing means is provided in said channel means between said additional heat exchanger and said additional blower for blocking the channel means upon excessive vehicle tipping thereby preventing escape of hot coolant.

17. A motor vehicle according to claim 1, wherein air guiding elements are located in said channel means upstream of said additional heat exchanger.

18. A motor vehicle according to claim 1, wherein a muffler is connected upstream of said additional blower.

19. A motor vehicle with a cab and a cooling system for a single internal combustion engine, said system comprising a heat exchanger disposed in an engine compartment and provided with an associated blower for providing approximately 70% of the maximum cooling power of said system, and at least one additional heat exchanger located outside the engine compartment and with which an additional blower is associated for providing the remaining cooling power of said system, and wherein said additional blower is mounted on a roof of the cab and is connected through channel means with said additional heat exchanger which is located within said channel means in the vicinity of one wall of the cab and at least partially within the contour of the cab as seen in front or side view so that there is no need to increase the length of the vehicle.

* * * * *